US012738615B2

(12) United States Patent
Lee et al.

(10) Patent No.: US 12,738,615 B2
(45) Date of Patent: Sep. 15, 2026

(54) ELECTROLYTE REINJECTION METHOD AND ELECTROLYTE-REINJECTABLE SECONDARY BATTERY

(71) Applicant: LG Energy Solution, Ltd., Seoul (KR)

(72) Inventors: Ji Eun Lee, Daejeon (KR); Eun Ju Lee, Daejeon (KR); Young Eun Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 650 days.

(21) Appl. No.: 18/254,680

(22) PCT Filed: Dec. 22, 2021

(86) PCT No.: PCT/KR2021/019597
§ 371 (c)(1),
(2) Date: May 26, 2023

(87) PCT Pub. No.: WO2022/139450
PCT Pub. Date: Jun. 30, 2022

(65) Prior Publication Data

US 2024/0030571 A1 Jan. 25, 2024

(30) Foreign Application Priority Data

Dec. 23, 2020 (KR) ........................ 10-2020-0182659

(51) Int. Cl.
*H01M 50/664* (2021.01)
*H01M 50/105* (2021.01)
(Continued)

(52) U.S. Cl.
CPC ....... *H01M 50/664* (2021.01); *H01M 50/105* (2021.01); *H01M 50/119* (2021.01);
(Continued)

(58) Field of Classification Search
None
See application file for complete search history.

(56) References Cited

U.S. PATENT DOCUMENTS

2011/0300437 A1 12/2011 Yi
2012/0148917 A1 6/2012 Kobayashi et al.
(Continued)

FOREIGN PATENT DOCUMENTS

CN 108604662 A 9/2018
CN 208298925 U 12/2018
(Continued)

OTHER PUBLICATIONS

Extended European Search Report including Written Opinion for Application No. 21911517.7, dated Nov. 15, 2024. 7 pgs.
(Continued)

*Primary Examiner* — Maria Laios
(74) *Attorney, Agent, or Firm* — Lerner David LLP

(57) ABSTRACT

A method for reinjecting an electrolyte, and a secondary battery capable of being reinjected with an electrolyte are described. The method for reinjecting an electrolyte is a method for reinjecting an electrolyte into a secondary battery in which an electrode assembly and an electrolyte are accommodated in a pouch. The pouch includes an aluminum sheet, in which a functional hole is formed, and a polymer layer stacked on the aluminum sheet. The method includes a reinjection process of injecting an additional electrolyte into the pouch through the functional hole by opening the functional hole, and a sealing process of sealing the functional hole after the reinjection process.

20 Claims, 4 Drawing Sheets

(51) Int. Cl.

| | |
|---|---|
| ***H01M 50/119*** | (2021.01) |
| ***H01M 50/121*** | (2021.01) |
| ***H01M 50/129*** | (2021.01) |
| ***H01M 50/30*** | (2021.01) |
| ***H01M 50/627*** | (2021.01) |

(52) U.S. Cl.

CPC ....... *H01M 50/121* (2021.01); *H01M 50/129* (2021.01); *H01M 50/394* (2021.01); *H01M 50/627* (2021.01)

(56) References Cited

U.S. PATENT DOCUMENTS

| | | | |
|---|---|---|---|
| 2012/0156562 | A1 | 6/2012 | Kobayashi et al. |
| 2012/0156563 | A1 | 6/2012 | Kobayashi et al. |
| 2013/0017437 | A1 | 1/2013 | Ahn |
| 2013/0115486 | A1 | 5/2013 | Saito et al. |
| 2016/0244620 | A1 | 8/2016 | Kobayashi et al. |
| 2018/0175364 | A1 | 6/2018 | Hong et al. |
| 2018/0351154 | A1 | 12/2018 | Park et al. |
| 2020/0052267 | A1 | 2/2020 | Hong et al. |
| 2020/0127248 | A1 | 4/2020 | Kim et al. |

FOREIGN PATENT DOCUMENTS

| | | | | |
|---|---|---|---|---|
| EP | 2869358 | A1 * | 5/2015 | .......... H01M 50/105 |
| EP | 3392933 | A1 * | 10/2018 | ........ H01M 10/6551 |
| JP | 2012089471 | A | 5/2012 | |
| JP | 2019503058 | A | 1/2019 | |
| KR | 20110082966 | A | 7/2011 | |
| KR | 20110132856 | A | 12/2011 | |
| KR | 10-2012-0058866 | A | 6/2012 | |
| KR | 20130000364 | A | 1/2013 | |
| KR | 101234243 | B1 | 2/2013 | |
| KR | 20130106796 | A | 9/2013 | |
| KR | 20130134948 | A | 12/2013 | |
| KR | 20140015647 | A | 2/2014 | |
| KR | 101379691 | B1 | 4/2014 | |
| KR | 101472202 | B1 | 12/2014 | |
| KR | 20150034498 | A | 4/2015 | |
| KR | 101543494 | B1 | 8/2015 | |
| KR | 10-2016-0038883 | A | 4/2016 | |
| KR | 20160090562 | A | 8/2016 | |
| KR | 20170094666 | A | 8/2017 | |
| KR | 20170112186 | A | 10/2017 | |
| KR | 20180023706 | A | 3/2018 | |
| KR | 101852662 | B1 | 4/2018 | |
| KR | 20180071799 | A | 6/2018 | |
| KR | 20180136751 | A | 12/2018 | |
| KR | 20180137346 | A | 12/2018 | |
| KR | 20180137347 | A | 12/2018 | |
| KR | 20180137348 | A | 12/2018 | |
| KR | 20190004538 | A | 1/2019 | |
| KR | 102031276 | B1 | 10/2019 | |
| KR | 102135805 | B1 | 7/2020 | |
| KR | 20200101745 | A | 8/2020 | |
| WO | 2011-024799 | A1 | 3/2011 | |

OTHER PUBLICATIONS

International Search Report for Application No. PCT/KR2021/019597 mailed Mar. 29, 2022. 3 pages.

* cited by examiner

ELECTROLYTE REINJECTION METHOD AND ELECTROLYTE-REINJECTABLE SECONDARY BATTERY

CROSS-REFERENCE TO RELATED APPLICATIONS

The present application is a national phase entry under 35 U.S.C. § 371 of the International Application No. PCT/KR2021/019597 filed on Dec. 22, 2021, which claims priority from Korean Patent Application No. 10-2020-0182659, filed on Dec. 23, 2020, the disclosures of which are incorporated herein by reference in their entireties.

FIELD OF THE INVENTION

The present invention relates to a method for reinjecting an electrolyte, and a secondary battery capable of being reinjected with an electrolyte.

BACKGROUND OF THE INVENTION

Recently, a secondary battery has been much researched and developed because it is rechargeable unlike a primary battery and there are possibilities of reducing the size and increasing the capacity. As technology development and demand for a mobile device increase, demand for the secondary battery as a power source has dramatically increased.

According to the shape of a battery case, the secondary battery is classified into a coin type battery, a cylindrical type battery, a prismatic type battery, and a pouch type battery. In the secondary battery, an electrode assembly mounted in a battery case has a stacked structure of an electrode and a separator, and is a power generation element that is chargeable and dischargeable.

The electrode assembly may be roughly classified into a jelly-roll type, which is wound by interposing a separator between sheet-shaped positive and negative electrodes coated with an active material, a stacked type, in which multiple positive and negative electrodes are stacked in sequence with a separator interposed therebetween, and a stack and folding type, in which stacked type unit cells are wound using a long separation film.

Recently, a pouch type battery, which has a structure in which the stacked type or stack and folding type electrode assembly is embedded in a pouch type battery case of an aluminum laminate sheet, has gained much interest due to low manufacturing cost, small weight, easy change of shape, etc., and the usage thereof has gradually increased.

However, there is a problem that an electrolyte is consumed during repeatedly charging and discharging the secondary battery and accordingly, the performance degradation occurs.

[Prior Art Document] (Patent Document) Korean Patent. Publication. No, 10-2014-0015647

BRIEF SUMMARY OF THE INVENTION

One aspect of the present invention is to provide a method for reinjecting an electrolyte, through which the electrolyte is easy to reinject, and a secondary battery capable of being reinjected with an electrolyte.

A method for reinjecting an electrolyte according to an embodiment of the present invention is a method for reinjecting an electrolyte into a secondary battery in which an electrode assembly and an electrolyte are accommodated in a pouch. The pouch may comprise an aluminum sheet, in which a functional hole is formed, and a polymer layer stacked on the aluminum sheet. The method may comprise a reinjection process of injecting an additional electrolyte into the pouch through the functional hole by opening the functional hole, and a sealing process of sealing the functional hole after the reinjection process.

In addition, a secondary battery capable of being reinjected with an electrolyte according to an embodiment of the present invention, comprises an electrode assembly, in which electrodes and separators are alternately stacked to be combined with each other, and a pouch in which the electrode assembly is accommodated, wherein the pouch comprises an aluminum sheet and a polymer layer laminated with the aluminum sheet, a functional hole is formed in the aluminum sheet, and a coating part is provided on an inner circumferential surface of the functional hole in the aluminum sheet.

According to the present invention, the secondary battery uses the pouch, in which the polymer layer is stacked on the aluminum sheet having the functional hole formed therein, so that the electrolyte is easily reinjected through the functional hole. In the secondary battery, the gas inside the pouch may penetrate the polymer layer through the functional hole and be easily discharged to the outside.

Figure 1:
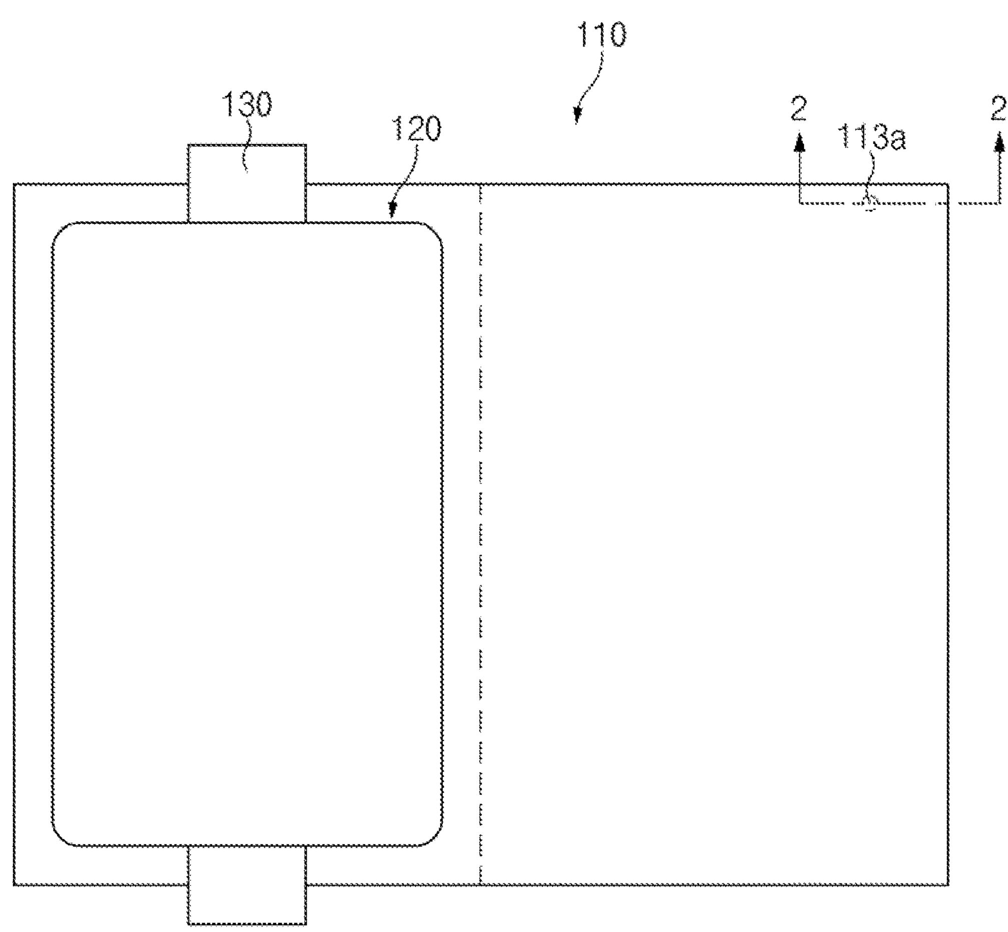
FIG. 1 is a plan view illustrating a secondary battery, which is applied to a method for reinjecting an electrolyte according to an embodiment of the present invention, in a state before an electrode assembly is accommodated in a pouch.

The object, advantages and features of the present invention will be clarified through following embodiments described with reference to the accompanying drawings. Note that the same or similar components in the drawings are designated by the same reference numerals as far as possible even if they are shown in different drawings. The present invention may be embodied in different forms and should not be construed as limited to the embodiments set forth herein. Further, the detailed descriptions of related well-known art that may unnecessarily obscure subject matters of the present invention, will be ruled out.

Electrolyte Reinjection Method

Figure 2:
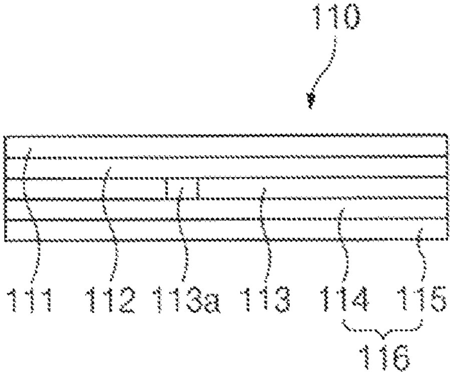
FIG. 2 is a cross-sectional view taken along a line 2-2 in FIG. 1.
Figure 3:
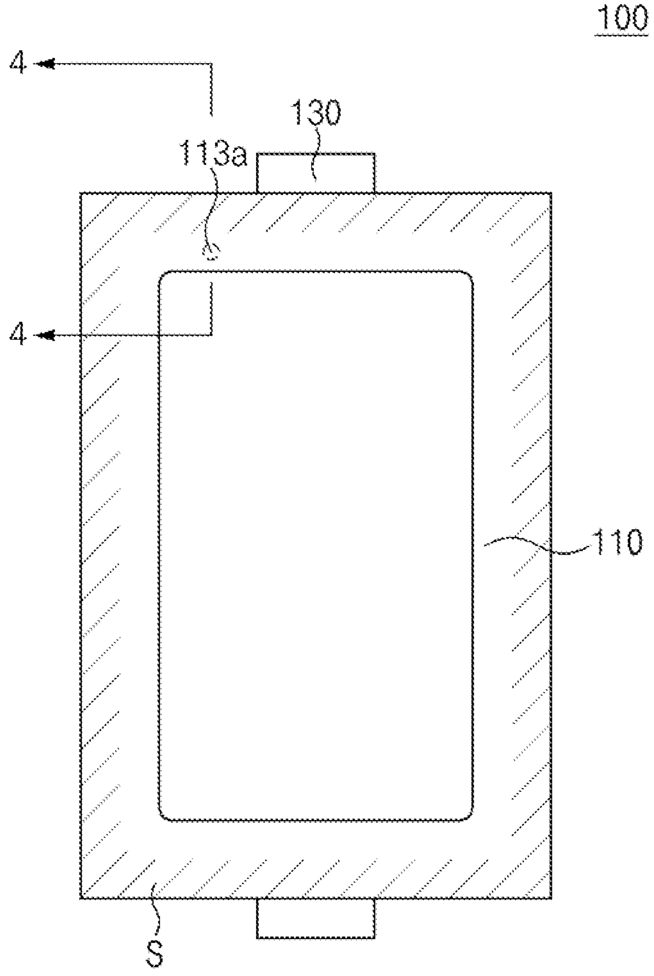
FIG. 3 is a plan view illustrating the secondary battery, which is applied to the method for reinjecting an electrolyte according to an embodiment of the present invention.
Figure 4:
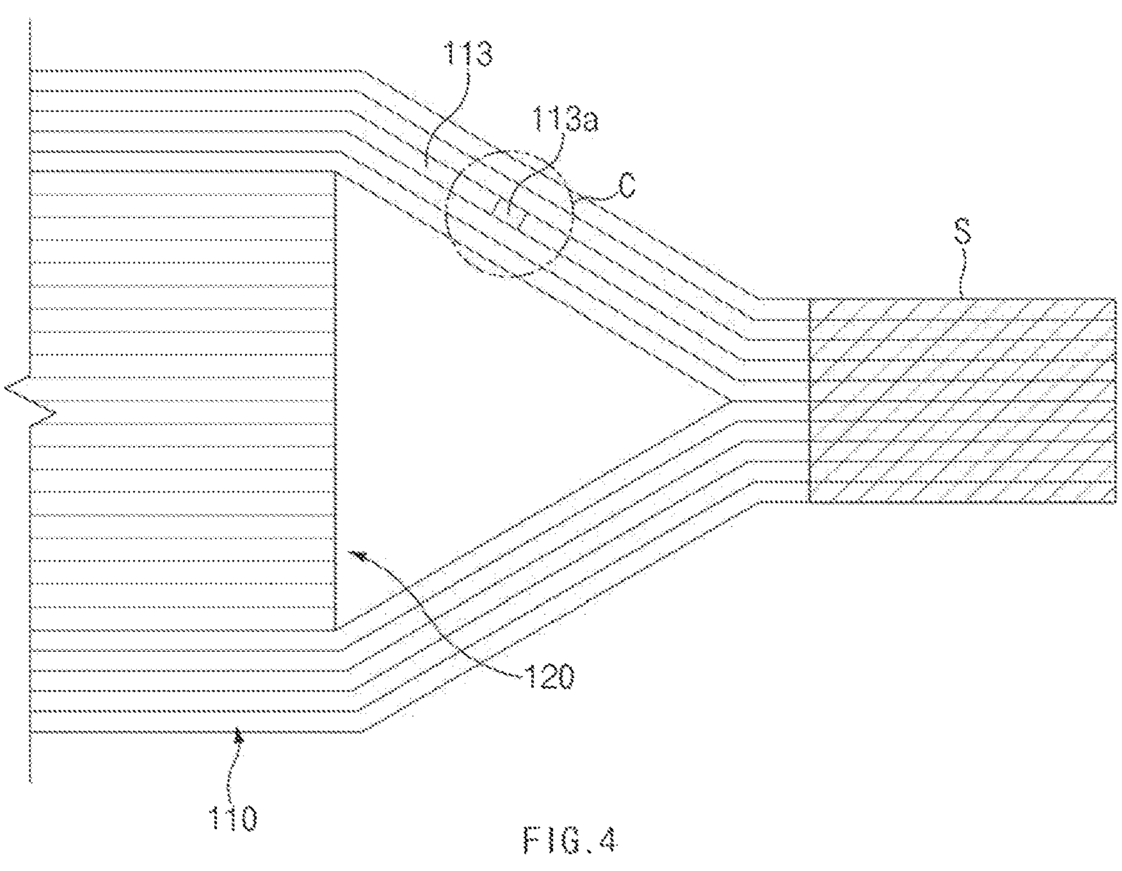
FIG. 4 is a cross-sectional view taken along a line 4-4 in FIG. 3.
Figure 5:
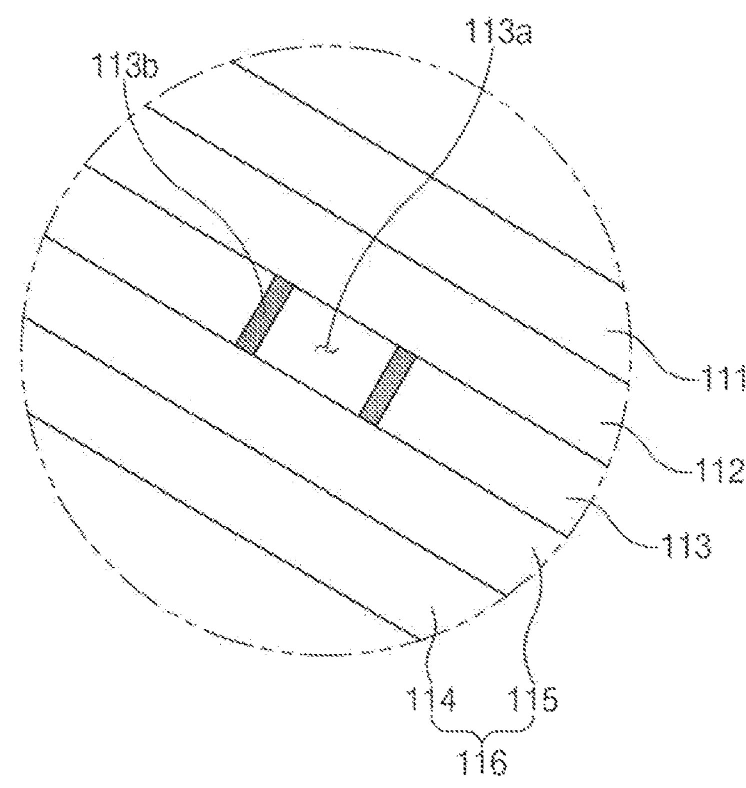
FIG. 5 is an enlarged cross-sectional view illustrating an area C in FIG. 4.

FIG. 1 is a plan view illustrating a secondary battery, which is applied to a method for reinjecting an electrolyte according to an embodiment of the present invention, in a state before an electrode assembly is accommodated in a pouch. FIG. 2 is a cross-sectional view taken along a line 2-2 in FIG. 1. FIG. 3 is a plan view illustrating the secondary battery, which is applied to the method for reinjecting an electrolyte according to an embodiment of the present invention. FIG. 4 is a cross-sectional view taken along a line 4-4 in FIG. 3. FIG. 5 is an enlarged cross-sectional view illustrating an area C in FIG. 4.

Figure 6:
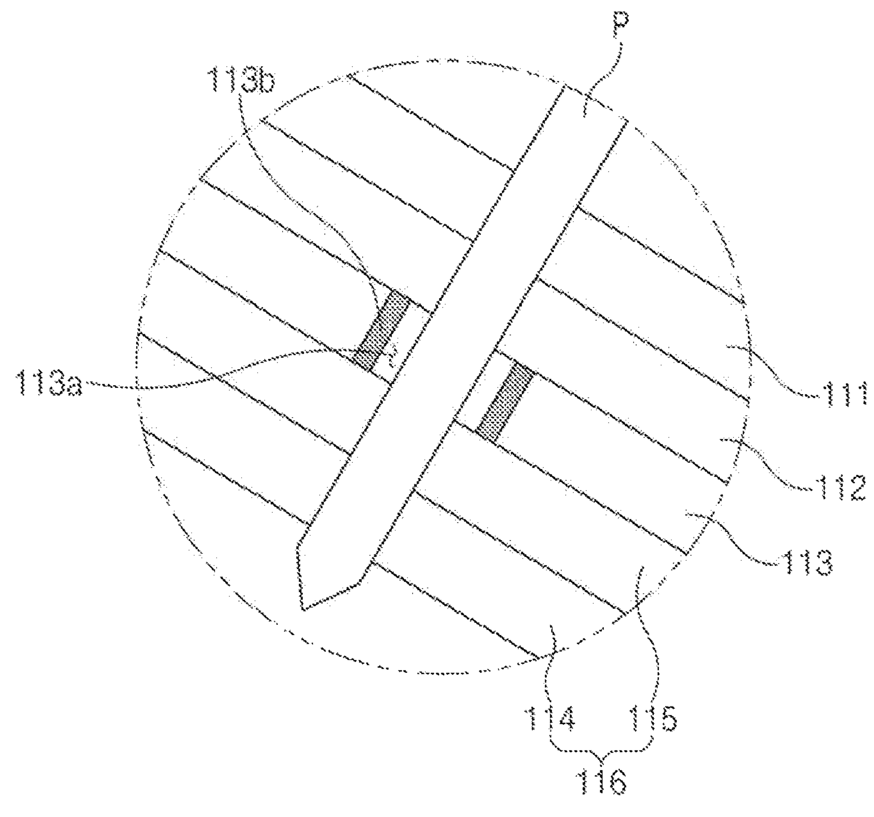
FIG. 6 is a cross-sectional view illustrating a concept of a reinjection process in the method for reinjecting an electrolyte according to an embodiment of the present invention.
Figure 7:
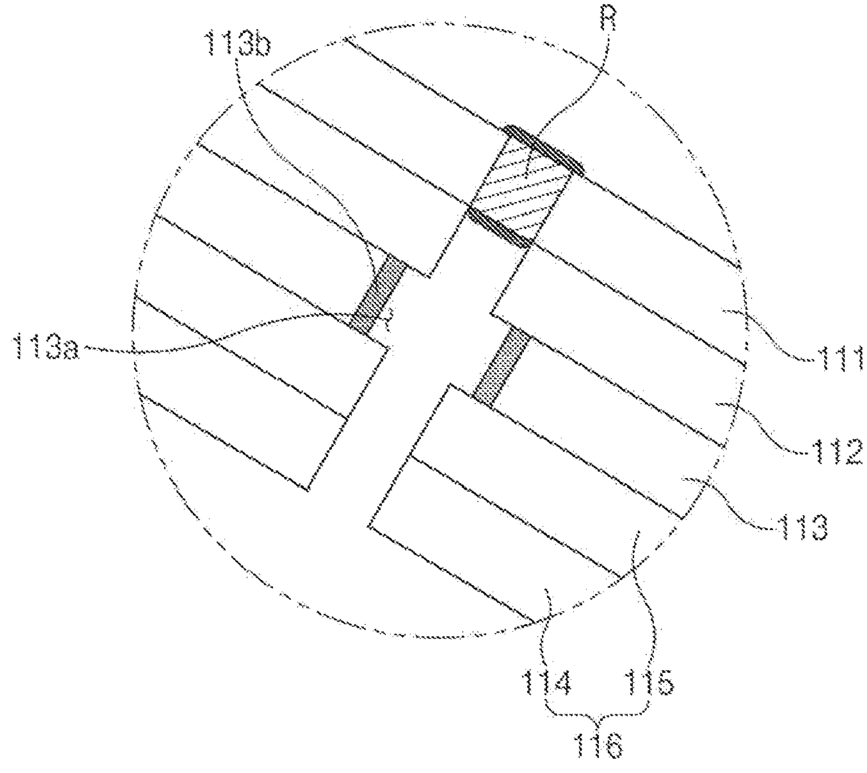
FIG. 7 is a cross-sectional view illustrating a concept of a sealing process in the method for reinjecting an electrolyte according to an embodiment of the present invention.

FIG. 6 is a cross-sectional view illustrating a concept of a reinjection process in the method for reinjecting an electrolyte according to an embodiment of the present invention. FIG. 7 is a cross-sectional view illustrating a concept of a sealing process in the method for reinjecting an electrolyte according to an embodiment of the present invention. FIGS. 6 and 7 are views illustrating respective examples of the concepts of the reinjection process and the sealing process by enlarging the area C in FIG. 4.

Referring to FIGS. 1 to 7, the method for reinjecting an electrolyte into a secondary battery according to an embodiment of the present invention is a method for reinjecting an electrolyte into a secondary battery 100 in which an electrode assembly 120 and an electrolyte are accommodated in a pouch 110. The pouch 110 comprises an aluminum sheet 113, in which a functional hole 113*a* is formed, and a polymer layer 111 and 116 stacked on the aluminum sheet 113. The method comprises a reinjection process of injecting an additional electrolyte into the pouch 110 through the functional hole 113*a*, and a sealing process of sealing the functional hole 113*a* after the reinjection process.

More specifically, referring to FIGS. 1 to 5, the method for reinjecting an electrolyte into the secondary battery 100 according to an embodiment of the present invention is a method for reinjecting an electrolyte into the secondary battery 100 in which the electrode assembly 120, which is assembled by alternately stacking an electrode and a separator, and an electrolyte are accommodated in the pouch 110.

The pouch 110 comprises the aluminum sheet 113, in which the functional hole 113*a* is formed, and the polymer layer 111 and 116 stacked on the aluminum sheet 113. A coating part 113*b* may be formed on an inner circumferential surface of the functional hole 113*a* in the aluminum sheet 113. The coating part 113*b* may comprise an insulating and chemically resistant material. Accordingly, after a hole is formed in a portion, corresponding to the functional hole 113*a*, of the polymer layer 111 and 116 to reinject an electrolyte in the subsequent electrolyte reinjection process, and then sealed through the sealing process, the aluminum sheet 113 may be prevented from being oxidized due to contact of the electrolyte with the functional hole 113*a* portion, or electric current may be prevented from being conducted between the electrode assembly 120 and the aluminum sheet 113 through the functional hole 113*a*. The coating part 113*b* may comprise, for example, silicone, but the material of the coating part 113*b* is not necessarily limited thereto.

Referring to FIGS. 4 and 6, in the reinjection process, an additional electrolyte is injected into the pouch 110 through the functional hole 113*a*. In the reinjection process, the functional hole 113*a* may be opened by forming a hole by means of a tool Pin the portion, covering the functional hole 113*a*, of the polymer layer 111 and 116.

In one example, in the reinjection process, the additional electrolyte may be injected through the functional hole 113*a* by piercing the portion, covering the functional hole 113*a*, of the polymer layer 111 and 116.

In another example, in the reinjection process, the additional electrolyte may be injected through the functional hole 113*a* by penetrating an injection needle into the portion, covering the functional hole 113*a*, the polymer layer 111 and 116.

The polymer layer 111 and 116 may comprise a first polymer layer 116 and a second polymer layer 111. The first polymer layer 116, the aluminum sheet 113, and the second polymer layer 111 may be stacked in the pouch 110 from the inside, in which the electrode assembly 120 is accommodated, to the outside. The first polymer layer 116 and the second polymer layer 111 may be formed on both surfaces of the aluminum sheet 113 to cover the functional hole 113*a* formed in the aluminum sheet 113. The first polymer layer 116 and the second polymer layer 111 may each comprise a polymer material. Accordingly, the first polymer layer 116 and the second polymer layer 111, which each comprise the polymer material permeable to gas such as CO and CO2, cover the functional hole 113*a* so that the internal gas may be discharged and the electrolyte may be prevented from being leaked through the functional hole 113*a*.

In the reinjection process, the electrolyte may be injected into the pouch 110 through the functional hole 113*a* by opening portions, covering the functional hole 113*a*, of the first polymer layer 116 and the second polymer layer 111. In the pouch 110, a nylon layer 112 may be further stacked between the aluminum sheet 113 and the second polymer layer 111. In the reinjection process, the electrolyte may be injected into the pouch 110 through the functional hole 113*a* by opening portions, covering the functional hole 113*a*, of the first polymer layer 116, the nylon layer 112, and the second polymer layer 111.

In one example, the first polymer layer 116 may be made of a polypropylene (PP) material, and the second polymer layer 111 may be made of a polyethylene terephthalate (PET) material.

In another example, in the first polymer layer 116, an inner layer, in which the electrode assembly 120 is accommodated, may be made of a polypropylene (PP) material, and an outer layer, which faces the aluminum sheet 113, may be made of a polyphthalamide (PPa) material. The second polymer layer 111 may be made of a polyethylene terephthalate (PET) material.

Referring to FIGS. 4 and 7, in the sealing process, the functional hole 113*a* may be sealed after the reinjection process.

In the sealing process, the functional hole 113*a* may be sealed by sealing the portion, corresponding to the functional hole 113*a*, opened in the second polymer layer 111. In the sealing process, the hole portion, corresponding to the functional hole 113*a*, opened in the second polymer layer 111, may be filled with a sealing material R to seal the functional hole 113*a*.

In one example, in the sealing process, the opened portion of the second polymer layer 111 may be sealed using a resin material R.

In another example, in the sealing process, the opened portion of the second polymer layer 111 may be sealed using the same material as the second polymer layer 111.

Accordingly, the opened portion of the second polymer layer 111 is sealed using the same material as the second polymer layer 111, which comprises the polymer material permeable to gas such as CO and CO2, so that the internal gas may be discharged even though the injection portion is sealed through the sealing process after the electrolyte reinjection, and the electrolyte may be prevented from being leaked through the functional hole 113*a*.

Electrolyte-Reinjectable Secondary Battery

Hereinafter, a secondary battery capable of being reinjected with an electrolyte according to an embodiment of the present invention will be described.

Referring to FIGS. 1 to 4, a secondary battery 100 capable of being reinjected with an electrolyte according to an embodiment of the present invention, comprises an electrode assembly 120, which is assembled by alternately stacking an electrode and a separator, and a pouch 110 in which the electrode assembly 120 is accommodated. The pouch 110 comprises an aluminum sheet 113 and a polymer layer 111 and 116 laminated with the aluminum sheet 113. A functional hole 113*a* is formed in the aluminum sheet 113.

The secondary battery 100 capable of being reinjected with an electrolyte according to an embodiment of the present invention pertains to the secondary battery 100 to which the method for reinjecting an electrolyte according to the embodiment described above is applied. Thus, the content in common with the embodiment described above will be omitted or briefly provided, and the description of this embodiment will be focused on differences.

More specifically, in the secondary battery 100 capable of being reinjected with an electrolyte according to an embodiment of the present invention, the electrode assembly 120 is a power generation element chargeable and dischargeable, and is assembled by alternately stacking an electrode and a separator.

The electrode may comprise a positive electrode and a negative electrode, and the positive electrode, the separator and the negative electrode may be alternately disposed.

In addition, the electrode assembly 120 may further comprise an electrode lead 130 connected to an end of the electrode. The electrode assembly 120 may be electrically connected to an external device through the electrode lead 130.

The pouch 110 may accommodate the electrode assembly 120. An accommodation part, in which the electrode assembly 120 is accommodated, may be formed inside the pouch 110.

In addition, the pouch 110 may comprise the aluminum sheet 113, and the polymer layer 111 and 116 laminated with the aluminum sheet 113.

The aluminum sheet 113 may form a layer in a sheet form of an aluminum material.

The functional hole 113*a* may be formed in the aluminum sheet 113. The functional hole 113*a* may be formed in the aluminum sheet 113 to have a size of about 1-9 mm.

The functional hole may be formed to penetrate the aluminum sheet 113 with respect to a stacked direction of the aluminum sheet 113 and the polymer layer 111 and 116.

The functional hole 113*a* may be formed between the electrode assembly 120 in the pouch 110 and an outer circumferential surface of the pouch 110.

In addition, the functional hole 113*a* may be formed in an aluminum sheet 113 portion at a side on which the electrode lead 130 is disposed.

The polymer layer 111 and 116 may comprise a first polymer layer 116 and a second polymer layer 111. The first polymer layer 116 and the second polymer layer 111 may be formed on both surfaces of the aluminum sheet 113 to cover the functional hold 113*a* formed in the aluminum sheet 113. The first polymer layer 116 and the second polymer layer 111 may each comprise a polymer material. Accordingly, the first polymer layer 116 and the second polymer layer 111, which each comprise the polymer material permeable to gas such as CO and $CO_2$, cover the functional hold 113*a* so that the internal gas may be discharged and the electrolyte may be prevented from being leaked through the functional hold 113*a*.

Referring to FIGS. 4 and 5, a coating part 113*b* may be provided on an inner circumferential surface of the functional hole 113*a* in the aluminum sheet 113.

The coating part 113*b* may be applied to cover the entirety of the inner circumferential surface of the functional hole 113*a* in the aluminum sheet 113. The coating part 113*b* may comprise an insulating and chemically resistant material. Accordingly, after a hole is formed in a portion, corresponding to the functional hole 113*a*, of the polymer layer 111 and 116 to reinject an electrolyte and then sealed, the aluminum sheet 113 may be prevented from being oxidized due to contact of the electrolyte with the functional hole 113*a*, or electric current may be prevented from being conducted between the electrode assembly and the aluminum sheet 113 through the functional hole 113*a*. That is, the coating part 113*b* is formed along the inner circumferential surface of the functional hole 113*a* so that the electrolyte may be prevented from being in direct contact with the aluminum sheet 113 when the electrolyte enters the functional hold 113*a* in the aluminum sheet 113 through the hole portion of the first polymer layer 116 after holes are formed in portions, corresponding to the functional hold 113*a*, of the first polymer layer 116 and the second polymer layer 111 and then the hole portion of the second polymer layer 111 is sealed after the electrolyte reinjection. In addition, the coating part 113*b* is formed along the inner circumferential surface of the functional hole 113*a* so that the electrode assembly 120 may be prevented from being in direct contact with the aluminum sheet 113 through the hole portion of the first polymer layer 116.

The coating part 113*b* may comprise, for example, silicone, but the material of the coating part 113*b* of the present invention is not necessarily limited thereto.

In addition, the first polymer layer 116, the aluminum sheet 113, and the second polymer layer 111 may be stacked in the pouch 110 from the inside, in which the electrode assembly 120 is accommodated, to the outside. In the pouch 110, the first polymer layer 116, the aluminum sheet 113, and the second polymer layer 111, which each have a thickness of about 10-90 μm, may be stacked and adhered. In addition, in the pouch 110, a nylon layer 112 may be further stacked between the aluminum sheet 113 and the second polymer layer 111. The nylon layer 112 is made of a nylon material so that gas may pass therethrough. When the holes are formed in the portions, corresponding to the functional hold 113*a* in the aluminum sheet 113, of the first polymer layer 116 and the second polymer layer 111 to reinject the electrolyte, a corresponding hole may be formed in the nylon layer 112.

The second polymer layer 111 may be made of a polyethylene terephthalate (PET) material.

In one example, the first polymer layer 116 may be made of a polypropylene (PP) material.

In another example, in the first polymer layer 116, an inner layer 115, in which the electrode assembly 120 is accommodated, may be made of a polypropylene (PP) material, and an outer layer 114, which faces the aluminum sheet 113, may be made of a polyphthalamide (PPa) material.

Referring to FIG. 3, a sealing part S may be formed on the outer circumferential surface of the pouch 110 to seal the inside of the pouch 110. The sealing part S may be formed through thermal fusion of the outer circumferential surface of the pouch 110 in a third direction or a fourth direction.

Although the present invention has been described with reference to the limited embodiments and drawings, the present invention is not limited thereto and may be variously implemented by those of ordinary skill in the art to which the present invention pertains, within the technical idea of the present invention.

In addition, the scope of the present invention may be defined by the appended claims.

DESCRIPTION OF THE SYMBOLS

100: Secondary battery
110: Pouch
111: Second polymer layer
112: Nylon layer
113: Aluminum sheet
113*a*: Functional hole
113*b*: Coating part
116: First polymer layer
120: Electrode assembly
130: Electrode lead

The invention claimed is:

1. A method for reinjecting an electrolyte into a secondary battery having an electrode assembly and an electrolyte accommodated in a pouch comprising an aluminum sheet with a functional hole formed therein, and a first polymer layer stacked on the aluminum sheet on a first side of the aluminum sheet and covering the functional hole and a second polymer layer stacked on the aluminum sheet on a second side and covering the functional hole, the method comprising:

injecting an additional electrolyte into the pouch through the functional hole by accessing the functional hole through the first and second polymer layers; and sealing the functional hole after the reinjection process.

2. The method of claim 1, wherein the additional electrolyte is injected through the functional hole by piercing a portion, covering the functional hole, of the first polymer layer and a portion, covering the functional hole, of the second polymer layer.

3. The method of claim 1, wherein the additional electrolyte is injected through the functional hole by penetrating an injection needle into a portion, covering the functional hole, of the first polymer layer and a portion, covering the functional hole, of the second polymer layer.

4. The method of claim 1, wherein the first polymer layer, the aluminum sheet, and the second polymer layer are stacked in the pouch from an inside, in which the electrode assembly is accommodated, to an outside, and wherein, the electrolyte is injected into the pouch through the functional hole by opening portions, covering the functional hole, of the first polymer layer and the second polymer layer.

5. The method of claim 4, wherein the functional hole is sealed by sealing the portion corresponding to the functional hole and is opened in the second polymer layer.

6. The method of claim 5, wherein the opened portion of the second polymer layer is sealed using a resin material.

7. The method of claim 5, wherein the opened portion of the second polymer layer is sealed using the same material as the second polymer layer.

8. The method of claim 4, wherein the first polymer layer is made of a polypropylene (PP) material, and the second polymer layer is made of a polyethylene terephthalate (PET) material.

9. The method of claim 4, wherein in the first polymer layer, an inner layer, in which the electrode assembly is accommodated, is made of a polypropylene (PP) material, and an outer layer, which faces the aluminum sheet, is made of a polyphthalamide (PPa) material, and the second polymer layer is made of a polyethylene terephthalate (PET) material.

10. The method of claim 1, wherein a coating part is formed on an inner circumferential surface of the functional hole in the aluminum sheet.

11. The method of claim 10, wherein the coating part comprises an insulating and chemically resistant material.

12. A secondary battery, configured for being reinjected with an electrolyte, comprising:

an electrode assembly in which electrodes and separators are alternately stacked to be combined with each other; and a pouch in which the electrode assembly is accommodated, wherein the pouch comprises an aluminum sheet, and a first polymer layer laminated with the aluminum sheet on a first side of the aluminum sheet and a second polymer layer laminated with the aluminum sheet on a second side of the aluminum sheet, a functional hole formed in the aluminum sheet, wherein the first and second polymer layers cover the functional hole, and a coating part provided on an inner circumferential surface of the functional hole in the aluminum sheet.

13. The secondary battery of claim 12, wherein the coating part covers an entire inner circumferential surface of the functional hole in the aluminum sheet.

14. The secondary battery of claim 12, wherein the coating part comprises an insulating and chemically resistant material.

15. The secondary battery of claim 12, wherein the coating part comprises silicone.

16. The secondary battery of claim 12, wherein the functional hole penetrates the aluminum sheet with respect to a stacked direction of the aluminum sheet and the polymer layer.

17. The secondary battery of claim 12, wherein the first polymer layer, the aluminum sheet, and the second polymer layer are stacked in the pouch from an inside, in which the electrode assembly is accommodated, to an outside.

18. The secondary battery of claim 17, wherein the first polymer layer is made of a polypropylene (PP) material, and the second polymer layer is made of a polyethylene terephthalate (PET) material.

19. The secondary battery of claim 17, wherein in the first polymer layer, an inner layer, in which the electrode assembly is accommodated, is made of a polypropylene (PP) material, and an outer layer, which faces the aluminum sheet, is made of a polyphthalamide (PPa) material, and the second polymer layer is made of a polyethylene terephthalate (PET) material.

20. The secondary battery of claim 18, wherein the functional hole is formed between the electrode assembly and an outer circumferential surface of the pouch in the pouch.

* * * * *